W. L. CHAPMAN.
PIPE LAYING APPARATUS.
APPLICATION FILED JULY 13, 1916.
1,220,188.
Patented Mar. 27, 1917.
2 SHEETS—SHEET 2.
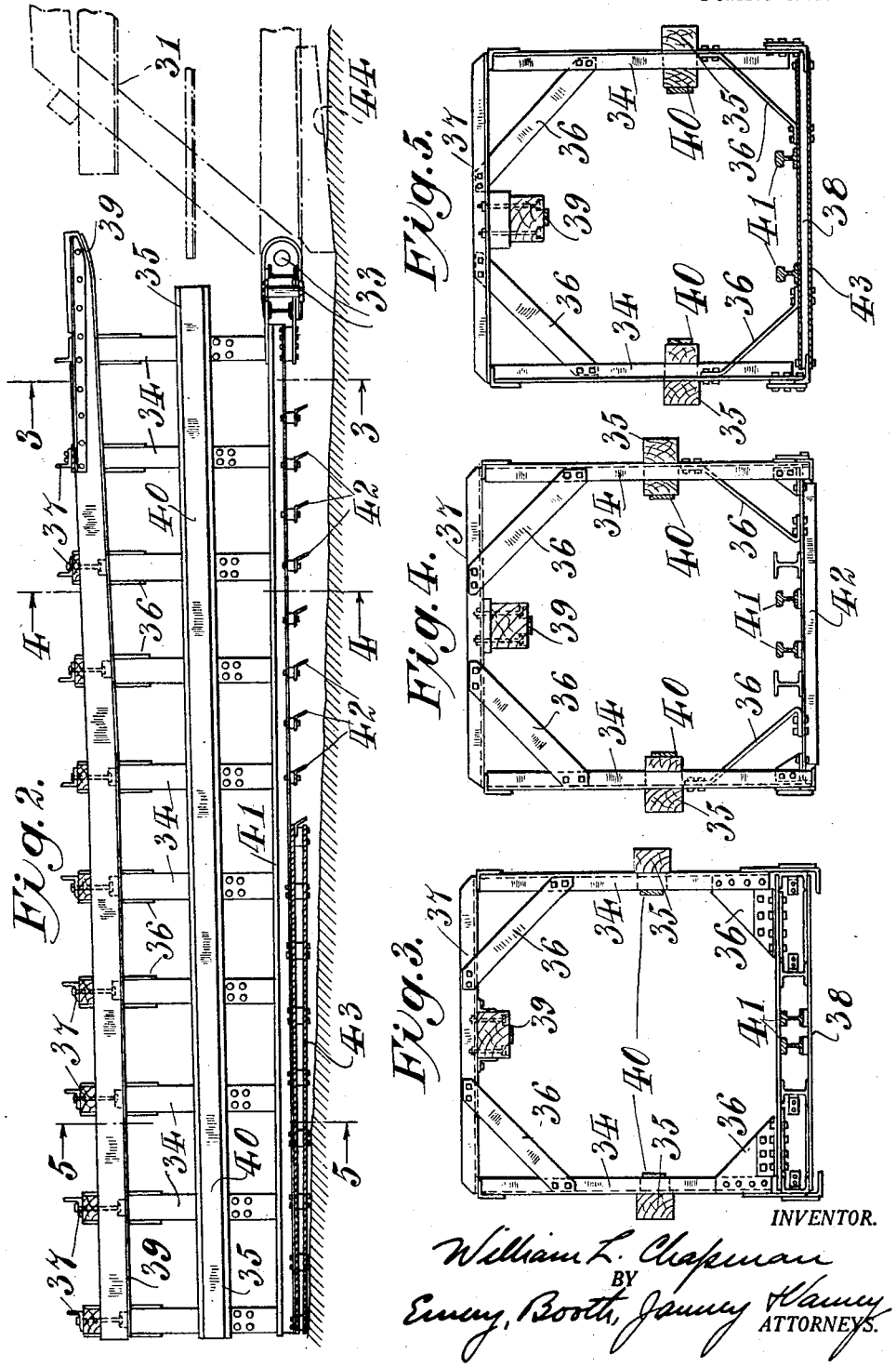

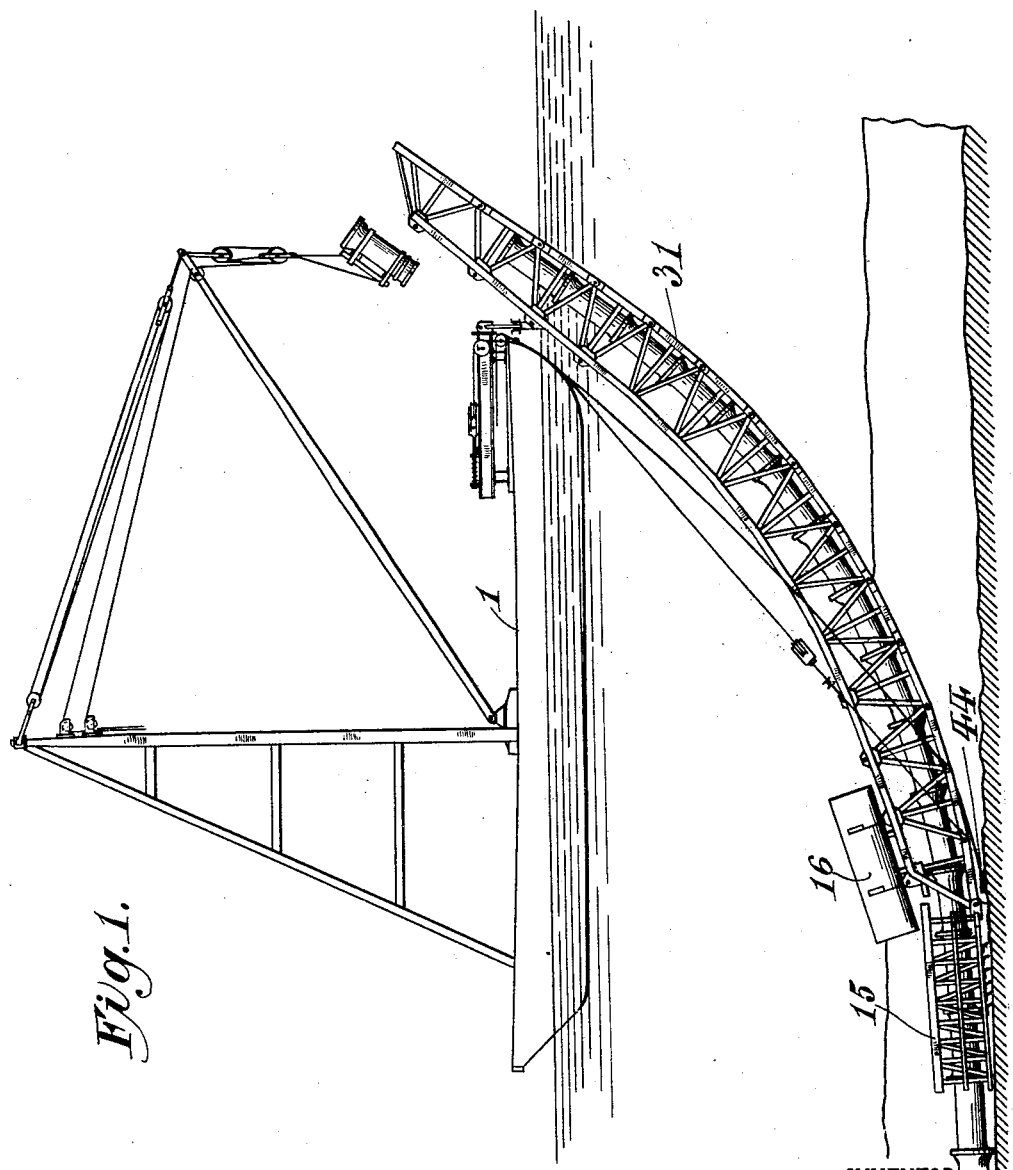

UNITED STATES PATENT OFFICE.

WILLIAM L. CHAPMAN, OF BROOKLYN, NEW YORK.

PIPE-LAYING APPARATUS.

1,220,188.  Specification of Letters Patent.  Patented Mar. 27, 1917.

Application filed July 13, 1916. Serial No. 109,033.

*To all whom it may concern:*

Be it known that I, WILLIAM L. CHAPMAN, a citizen of the United States, and a resident of the borough of Brooklyn of the city of New York, in the State of New York, have invented an Improvement in Pipe-Laying Apparatus, of which the following is a specification.

This invention relates more particularly to a straightening device for pipe laying apparatus which is especially adapted to that type of pipe laying apparatus employed in subaqueous work.

In the accompanying drawings, in which I have illustrated an embodiment of my invention actually used by me in the construction of a pipe line across the Narrows of New York harbor, Figure 1 is a view in side elevation showing the straightener in connection with the type of pipe laying apparatus referred to.

Fig. 2 is a view in side elevation, on a larger scale, of the straightener.

Fig. 3 is a transverse section of the straightener, the plane of the section being indicated by the line 3—3 in Fig. 2, Fig. 4 is a transverse section of the straightener, the plane of the section being indicated by the line 4—4 in Fig. 2, and, Fig. 5 is a transverse section of the straightener, the plane of the section being indicated by the line 5—5 in Fig. 2.

As shown in Fig. 1, and more fully described in my companion application, Serial No. 109,034, filed July 13, 1916, successive sections of pipe are flexibly united at a convenient point near the upper end of a launching skid 31. As the skid is moved forward the line of pipe slides down, passes out the lower end of the skid, and enters the straightener 15 which is preferably attached to the skid by a universal joint 33, best shown in Fig. 2 of the drawings. It will be seen that in passing down the launching skid, the line of pipe assumes a curve in conformity with the curvature of the skid. Moreover, in its passage down the skid and as it emerges from the lower end thereof, the line of pipe is likely to be subject to more or less deflection of joints; and it is the function of the straightener to aline the pipe properly and to deposit it in position so that it will lie substantially straight.

The skid is supported by being secured at its upper end to a scow 1 while its lower end may be provided with a buoyancy device to be inflated as required, such as a pneumatic pontoon 16 as explained in the companion application referred to. The rolling and pitching of the scow, as will readily be understood, causes the upper end of the skid to have up and down as well as sidewise motion, while the lower end of the skid, being free of the scow, does not partake to any substantial degree in its movements. The consequence is, the skid oscillates continuously during the laying of the pipe, upon the lower end thereof as a pivot. By providing a universal joint between the skid and the straightener, this oscillation takes place freely without disturbing the straightener and consequently without any substantial disturbance to the sections of the pipe resting in and deposited back of the straightener.

The straightener itself, as will be seen particularly from Fig. 2, is a box-shaped structure or frame embracing the line of pipe and secured to the skid as a trailer. It has side braces 34 reinforced by longitudinal braces 35, transverse braces 36, and cross pieces 37 and 38 along the top and bottom respectively. It is so constructed as to taper for part of its length, that is, to provide a tapering guideway for the pipe, having its greatest inside depth and breadth at the end next to the launching skid (indicated by broken lines in Fig. 2) and its least inside depth and breadth toward the end where the pipe is discharged. Figs. 3, 4 and 5 show the relative depths of sections taken through the vertical planes indicated. Moreover, from these three figures it can be seen how the interior of the straightener is provided with guideways for the pipe, to secure the tapering aforesaid, that is to say, with a top guideway 39, side guideways 40 and bottom guideways 41.

The length of the straightener is preferably at least equivalent to the combined length of two pipe sections. The oscillation of the skid about the universal joint connecting the trailer thereto takes place without binding or jamming on account of the rigidity of the pipe line, and such flexings of the joints in the pipe as take place in that portion thereof in advance of the straightener are not transmitted to the pipe already resting in and deposited by the straightener.

In attaching the straightener to the skid (Fig. 2), it will be observed that it is supported at its forward end by the skid while resting freely upon the soft soil, or such other surface as it moves upon, at its rear end. This leaves the forward end of the straightener free of the surface underneath (Fig. 2). Extending from the bottom of the forward end of the straightener are a number of blades 42 which constitute planing knives to shave off the top of any obstruction which has been left by the dredging, or in case there has been no dredging, to remove the top of any obstruction lying in the path of the pipe. These planing knives are so arranged that their cutting edges are at successively lower levels as they recede from the skid, whereby each knife acts to scrape off or remove a portion of the obstruction until the latter has been planed down to the level of the cutting edge of the last knife. The bottom of the rear of the straightener is provided with a long flat bearing plate 43 in order to prevent the straightener, under the weight of the pipe, from sinking too far into the soft soil or such other surface as it rests upon.

In the device actually used by me, the submerged end of skid was supported on a sled 44 so that it rested at about 8 inches from the bottom of the trench which was dredged previously to laying the pipe. Thus the knives did not normally touch the surface of the trench, and therefore performed no scraping action whatever except when they came upon a lump which projected high enough from the bottom of the trench to come into their path. The tops of all such lumps were thus planed off, but the knives were not brought into play except when such lumps presented themselves. It is undesirable and inconvenient to have a continuous scraping action, as these knives would provide for instance, if they were so arranged as to rest down at all times upon the soil underneath.

The operation of the improved apparatus will be fully understood without further description. It is obvious that while it will generally be used in subaqueous work, there is no reason why it should be confined thereto and the claims accordingly are drawn to cover any pipe laying device whether for use on land or in subaqueous work.

I claim as my invention:

1. The combination with a skid for laying a line of pipe, of a straightening device for the pipe, at the discharging ends of the skid, and a universal joint connecting said straightening device and the skid whereby the oscillations of the skid around the lower end thereof as a center are not communicated to the straightening device.

2. The combination with a skid for laying a line of pipe and a buoyancy device for supporting the lower end of the skid, at the discharging end of the skid, a straightening device and a universal joint connecting said straightening device and the skid whereby the oscillations of the skid around the lower end thereof as a center are not communicated to the straightening device.

3. The combination with a skid for laying a line of pipe, a scow for supporting the upper end of the skid, and a buoyancy device for supporting its lower end, at the discharging end of the skid, a straightening device and a universal joint connecting said straightening device and the skid whereby the oscillations of the skid around the lower end thereof as a center are not communicated to the straightening device.

4. The combination with a skid for laying a line of pipe, of a straightening device pivoted to the discharging end of the skid and adapted to embrace the pipe as it leaves the skid and forming a tapering guide channel therefor.

5. The combination with apparatus for laying a line of pipe, of a trailer connected to said apparatus so as to be drawn along by the same, said trailer being box-shaped so as to embrace the pipe, and having means to provide a guideway therefor tapering both laterally and vertically for part of its length.

6. The combination with apparatus for laying a line of pipe, of a launching skid, and a trailer flexibly connected to said skid so as to be drawn along by the same, said trailer having a plurality of planing devices projecting from its bottom.

7. The combination with apparatus for laying a line of pipe, of a trailer secured to said apparatus so as to be drawn along by the same, said trailer having a plurality of planing devices projecting from its bottom and having their planing knives at successively lower levels as they recede from said apparatus.

8. The combination with apparatus for laying a line of pipe, of a trailer secured to and supported at its forward end by said apparatus, and having its rear end free, said forward end being elevated relatively to the rear end and provided with planers, and said rear end having a flat bearing plate to support it upon soft soil or such other bed as it may rest upon.

9. The combination with a skid for laying a line of pipe, of a trailer supported at its forward end by and pivoted to the lower end of the skid and provided with means for straightening the pipe, said trailer having planing devices at its forward end and a flat bearing plate to rest upon soft soil or the like at its rear end.

10. A device for straightening a line of pipe and smoothing the surface upon which it rests, said device comprising a tapering frame adapted to embrace the pipe and means projecting from the bottom of the frame to plane off the supporting surface underneath.

11. Pipe-laying apparatus combining a skid connected to a scow, and a straightening device connected to said skid so as to be drawn along by the same, said device being box-shaped so as to embrace the pipe, and having means to provide a guideway therefor tapering both laterally and vertically for part of its length.

In testimony whereof, I have signed my name to this specification this tenth day of July, 1916.

WILLIAM L. CHAPMAN.

Copies of this patent may be obtained for five cents each, by addressing the "Commissioner of Patents, Washington, D. C."